US012678917B2

(12) United States Patent
Springer

(10) Patent No.: US 12,678,917 B2
(45) Date of Patent: Jul. 14, 2026

(54) SYSTEMS AND METHODS FOR CLAMPING PROJECTS

(71) Applicant: Reid Springer, Wausau, WI (US)

(72) Inventor: Reid Springer, Wausau, WI (US)

( * ) Notice: Subject to any disclaimer, the term of this patent is extended or adjusted under 35 U.S.C. 154(b) by 0 days.

(21) Appl. No.: 19/097,484

(22) Filed: Apr. 1, 2025

(65) Prior Publication Data

US 2025/0303524 A1 Oct. 2, 2025

Related U.S. Application Data

(60) Provisional application No. 63/573,202, filed on Apr. 2, 2024.

(51) Int. Cl.
*B25B 5/02* (2006.01)

(52) U.S. Cl.
CPC .................................... *B25B 5/02* (2013.01)

(58) Field of Classification Search
CPC .... B25B 5/00; B25B 5/02; B25B 5/04; B25B 5/082; B25B 5/101; B25B 5/125; B25B 5/06; B25B 5/068; B25B 5/10
USPC ........................................ 269/143, 249, 166
See application file for complete search history.

(56) References Cited

U.S. PATENT DOCUMENTS

| | | | | |
|---|---|---|---|---|
| 3,508,665 A | | 4/1970 | Arthur | |
| 4,792,129 A | * | 12/1988 | LePrevost, Jr. | B25B 5/10 269/46 |
| 4,821,393 A | * | 4/1989 | Spigarelli | B25B 5/06 29/283 |
| 5,192,060 A | * | 3/1993 | Novak | B25B 5/003 269/155 |
| 5,467,972 A | * | 11/1995 | Lee | B25B 5/10 269/118 |
| 6,233,900 B1 | * | 5/2001 | Gill | B25B 5/003 52/584.1 |
| 6,234,328 B1 | | 5/2001 | Mason | |
| 6,491,294 B1 | * | 12/2002 | Hyatt | B25B 5/145 269/155 |
| 11,110,559 B2 | | 9/2021 | Cross | |

(Continued)

OTHER PUBLICATIONS

"Bessey KT5-1CP Single Spindle Edge Clamp for Use With Clamp Rails up to 1/2," https://www.amazon.com/dp/B0000DD2QH?ref=cm_sw_r_cso_em_apan_dp_ZJRHT6E3TSEPCSZ8ZZCV&ref_=cm_sw_r_cso_em_apan_dp_ZJRHT6E3TSEPCSZ8ZZCV&social_share=cm_sw_r_cso_em_apan_dp_ZJRHT6E3TSEPCSZ8ZZCV&starsLeft=1&th=1.

*Primary Examiner* — Sarang Afzali
*Assistant Examiner* — Darrell C Ford
(74) *Attorney, Agent, or Firm* — Andrus Intellectual Property Law, LLP

(57) ABSTRACT

A clamped project bracket assembly for securing a clamped project is provided. The assembly includes a clamp assembly having a structural member, a first clamp portion and a second clamp portion. The first and second clamp portions apply a force along a first direction to the clamped project. The assembly further includes a clamping caul assembly having a first side bracket and a second side bracket detachably coupled to the clamp assembly, and a top bracket coupled to the first and second side brackets. The top bracket includes a recess formed therethrough. The clamping caul assembly further includes at least one threaded member terminating in a clamp end. The threaded member is configured to extend through the recess and the clamp end is configured to apply a force along a second direction to the clamped project that is perpendicular to the first direction.

19 Claims, 8 Drawing Sheets

(56) References Cited

U.S. PATENT DOCUMENTS

| | | | | |
|---|---|---|---|---|
| 11,897,070 | B1 * | 2/2024 | Garrison | B25B 1/10 |
| 2011/0089621 | A1 * | 4/2011 | Seidel | B25B 5/145 269/46 |
| 2015/0174738 | A1 * | 6/2015 | Beauregard | B25B 1/103 269/148 |
| 2022/0395963 | A1 | 12/2022 | Draeger | |

* cited by examiner

SYSTEMS AND METHODS FOR CLAMPING PROJECTS

CROSS-REFERENCE TO RELATED PATENT APPLICATION

The present application claims the benefit of U.S. Provisional Application Ser. No. 63/573,202, filed Apr. 2, 2024, which is incorporated by reference herein in its entirety.

FIELD

The present application relates to tools used in clamped projects such as woodworking projects, and more specifically to clamping caul assemblies for clamped projects.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to an exemplary implementation of the present disclosure, a clamped project bracket assembly for securing a clamped project is provided. The assembly includes a clamp assembly having a structural member, a first clamp portion and a second clamp portion. The first and second clamp portions apply a force along a first direction to the clamped project. The assembly further includes a clamping caul assembly having a first side bracket and a second side bracket detachably coupled to the clamp assembly, and a top bracket coupled to the first and second side brackets. The top bracket includes a recess formed therethrough. The clamping caul assembly further includes at least one threaded member terminating in a clamp end. The threaded member is configured to extend through the recess and the clamp end is configured to apply a force along a second direction to the clamped project that is perpendicular to the first direction.

According to another exemplary implementation of the present disclosure, a method of securing a clamped project is provided. The method includes providing a clamp assembly comprising a structural member, a first clamp portion and a second clamp portion, and positioning the clamped project between the first clamp portion and the second clamp portion. At least one of the first clamp portion and the second clamp portion are configured to be moved along a first direction relative to the structural member to apply a force along the first direction to the clamped project. The method further includes coupling a clamping caul assembly to the clamp assembly. The clamping caul assembly includes a first side bracket and a second side bracket, a top bracket coupled to the first side bracket and the second side bracket and configured such that the clamped project is located between the top bracket and the structural member, wherein the top bracket comprises at least one recess formed therethrough, and at least one threaded member terminating in a clamp end, wherein the at least one threaded member is configured to extend through the at least one recess. The method further includes moving the clamp end relative to the top bracket to apply a force along a second direction to the clamped project that is perpendicular to the first direction.

BRIEF DESCRIPTION OF DRAWINGS

Examples of clamping caul assemblies and portions thereof are described with reference to the following Figures. The same numbers are used throughout the Figures to reference like features and like components.

DETAILED DESCRIPTION

Figure 1:
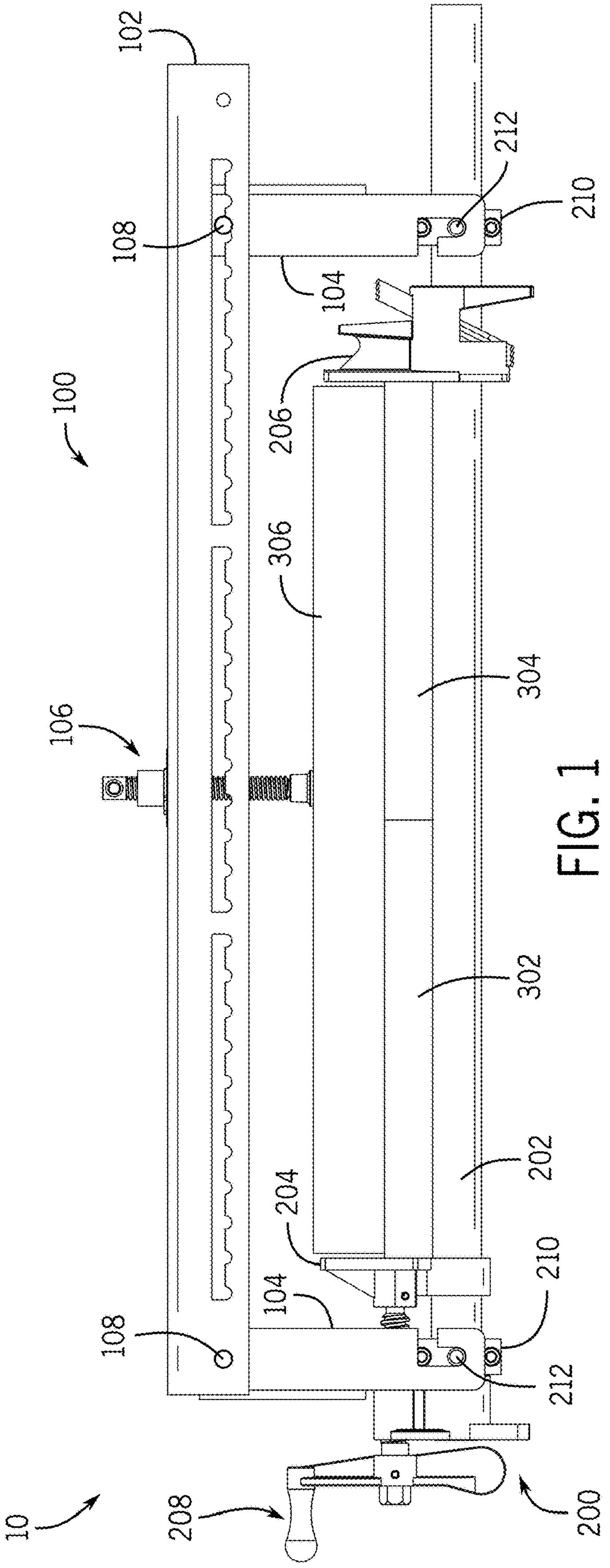
FIG. 1 is a front view of a clamped project bracket assembly according to an exemplary implementation of the present disclosure.
Figure 2:
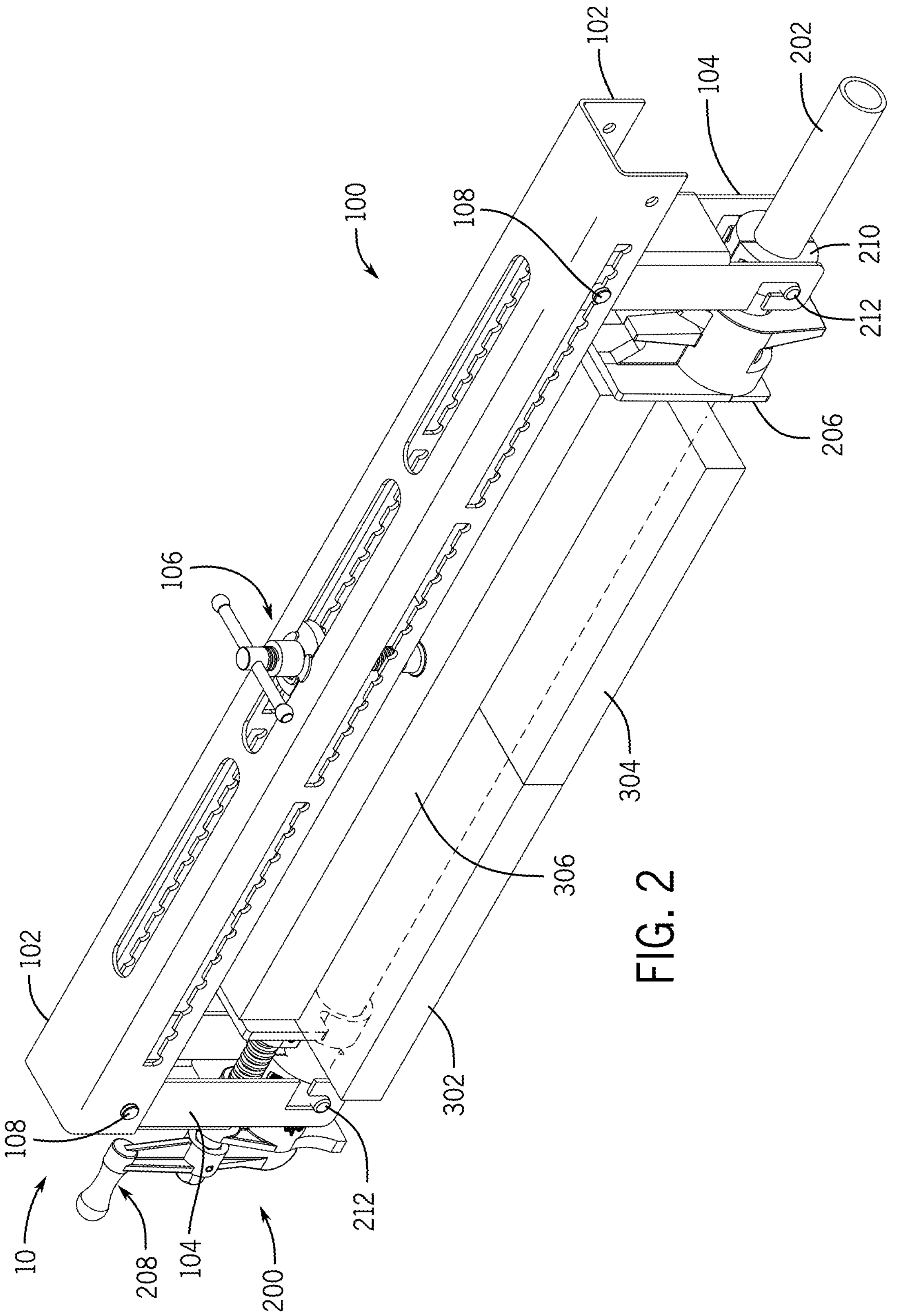
FIG. 2 is a perspective view of the clamped project bracket assembly of FIG. 1.
Figure 3:
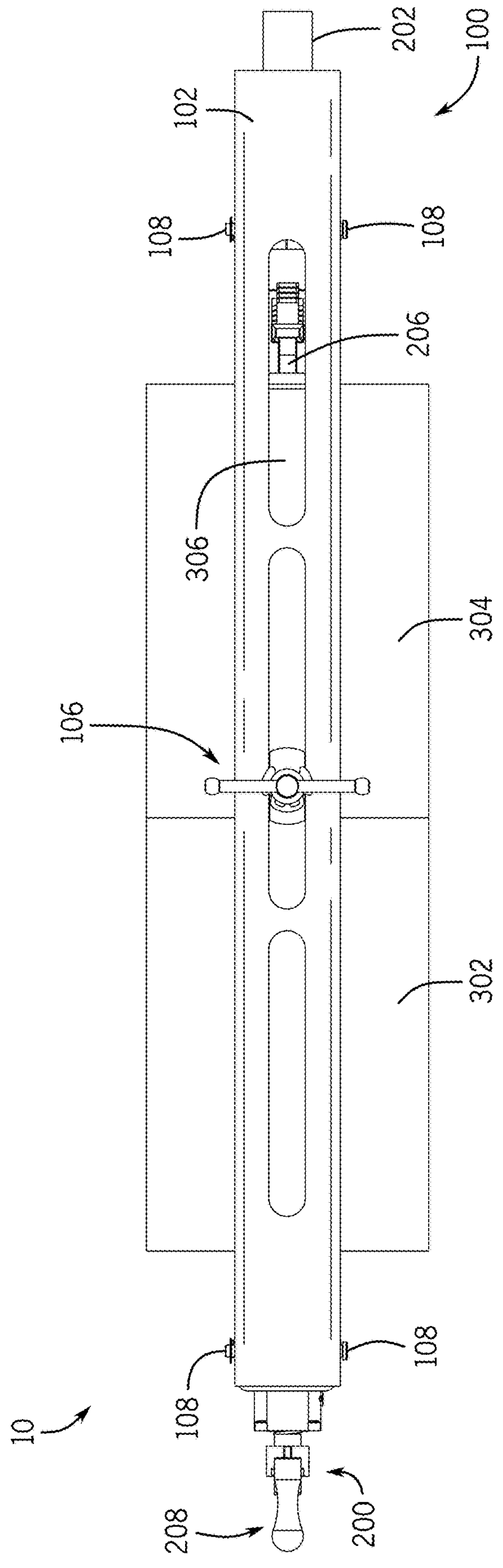
FIG. 3 is a top view of the clamped project bracket assembly of FIG. 1.
Figure 4:
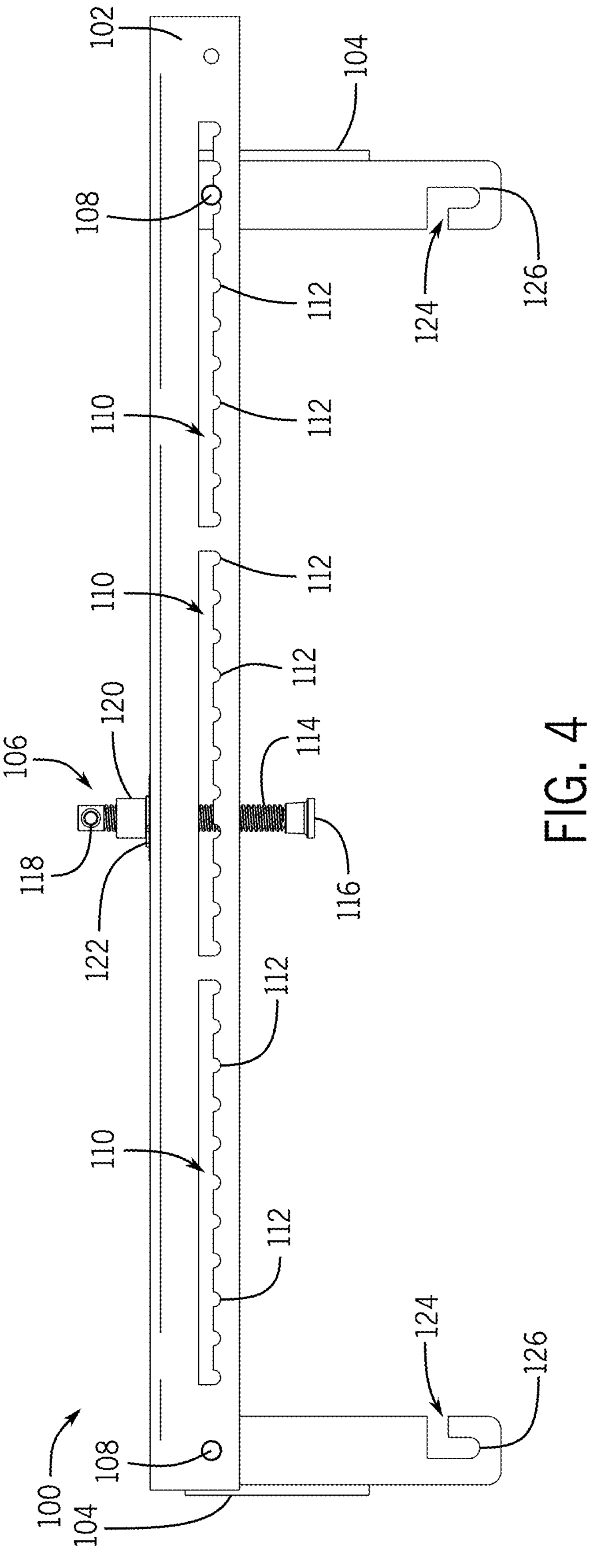
FIG. 4 is a front view of a clamping caul assembly that may be utilized in the clamped project bracket assembly of FIG. 1.

The present application relates to systems and methods for clamping various projects, and particularly woodworking projects, during a period in which the project is clamped to permit a glue or other adhesive to cure. FIGS. 1-3 depict a clamped project bracket assembly 10 according to an exemplary implementation of the present disclosure. The clamped project bracket assembly 10 is shown to include a clamping caul assembly 100 and a project clamp assembly 200 that are configured to exert forces on a glued project comprised of a first glued project portion 302 and a second glued project portion 304. Specifically, the clamping caul assembly 100 is configured to exert forces on the glued project portions 302, 304 along a vertical direction (i.e., normal to the joint between the project portions 302, 304) via a threaded clamp assembly 106 of the clamping caul assembly 100 that acts upon a caul 306. In various implementations, the caul 306 may be any material that is sufficiently strong and inflexible under the load exerted upon it by the threaded clamp assembly 106. For example, the caul 306 could be fabricated from wood (e.g., pine) or metal (e.g., steel tubing, angle iron). Further details regarding the clamping caul assembly 100 are included below with reference to FIGS. 4-11.

The project clamp assembly 200 is configured to exert forces on the glued project portions 302, 304 in a horizontal direction (i.e., parallel to the joint between the project portions 302, 304) via a first project clamp portion 204 and a second project clamp portion 206 that are movable along a structural member (e.g., a rod or pipe) 202 to accommodate different project sizes. For example, a user may slide the second project clamp 206 to a suitable position along the rod 202 to accommodate positioning of the project portions 302, 304 between the first and second project clamp portions 204, 206. Once the project portions 302, 304 are positioned in this way, a user may rotate handle 208 of a clamp adjustment mechanism to move the first project clamp portion 204 closer to the second project clamp portion 206 and thereby compress the project portions 302, 304 towards each other in the horizontal direction to aid in the joining of the project portions 302, 304 to each other during a curing process. In some embodiments, the first and second project clamps 204, 206 may be utilized to only to locate and retain a project rather than apply a force along a horizontal direction. For example, projects including wood inlays may require clamping only in vertical direction as provided by the clamping caul assembly 100 to retain the inlaid components within the larger project.

The project clamp assembly 200 is further shown to include a pair of suspension clamp assemblies 210. Each of the suspension clamp assemblies 210 is shown to be secured to pipe 202 outwardly of the first and second project clamp portions 204, 206. Like the clamp portions 204, 206, the suspension clamp assemblies 210 may be movable along the pipe 202 to accommodate different project sizes. In an exemplary implementation, the suspension clamp assemblies 210 are further configured to be utilized to suspend the project clamp assembly 200 and the project portions 302, 304 from a suspension bracket (not shown) as described in U.S. Patent App. No. 63/620,603, filed Jan. 12, 2024, and incorporated by reference herein in its entirety. Each of the suspension clamp assemblies 210 also includes a pair of locating pins 212 extending therefrom. The locating pins 212 are configured to engage with side brackets 104 of the clamping caul assembly 100 to locate and retain the clamping caul assembly 100 relative to the project portions 302, 304. The clamping caul assembly 100 is further shown to include a top bracket 102 and a pair of clevis pins 108 that extend through the top bracket 102 and the side brackets 104 to retain the top bracket 102 and the side brackets 104 to each other.

Referring now to FIGS. 4-11, various views of the clamping caul assembly 100 and its constituent components are depicted. The clamping caul assembly 100 includes a top bracket 102 and a pair of side brackets 104 that are detachably coupled to each other by clevis pins 108. The top bracket 102 is shown to be generally U-shaped with a top wall and a pair of side walls extending perpendicularly therefrom. The top bracket 102 is further shown to include multiple locating recesses 110 formed through the pair of side walls. Each of the locating recesses 110 is shown to include multiple semi-circular shaped pin receiving portions 112 that are configured to receive one of the clevis pins 108 and thereby locate one of the side brackets 104 in a horizontal direction relative to the top bracket 102. As described above, since the side brackets 104 are configured to couple to the suspension clamp assemblies 210 which are movable in a horizontal direction relative to the pipe 202 to accommodate different project sizes, by providing multiple pin receiving portions 112 within the locating recesses 110, the positions of the side brackets 104 can likewise be modified to accommodate multiple project sizes within the clamping caul assembly 100. The number of locating recesses 110 and pin receiving portions 112 formed in top bracket 102 depicted in the FIGURES is merely exemplary, and in in different implementations, a different number of locating recesses 110 and pin receiving portions 112 may be utilized, as well as differently shaped locating recesses 110 and/or pin receiving portions 112. For example, in some embodiments, the pin receiving portions 112 may not be joined to each other, and may be separately formed (e.g., as circular or oval-shaped recesses formed through the side walls of the top bracket 102).

Figure 5:
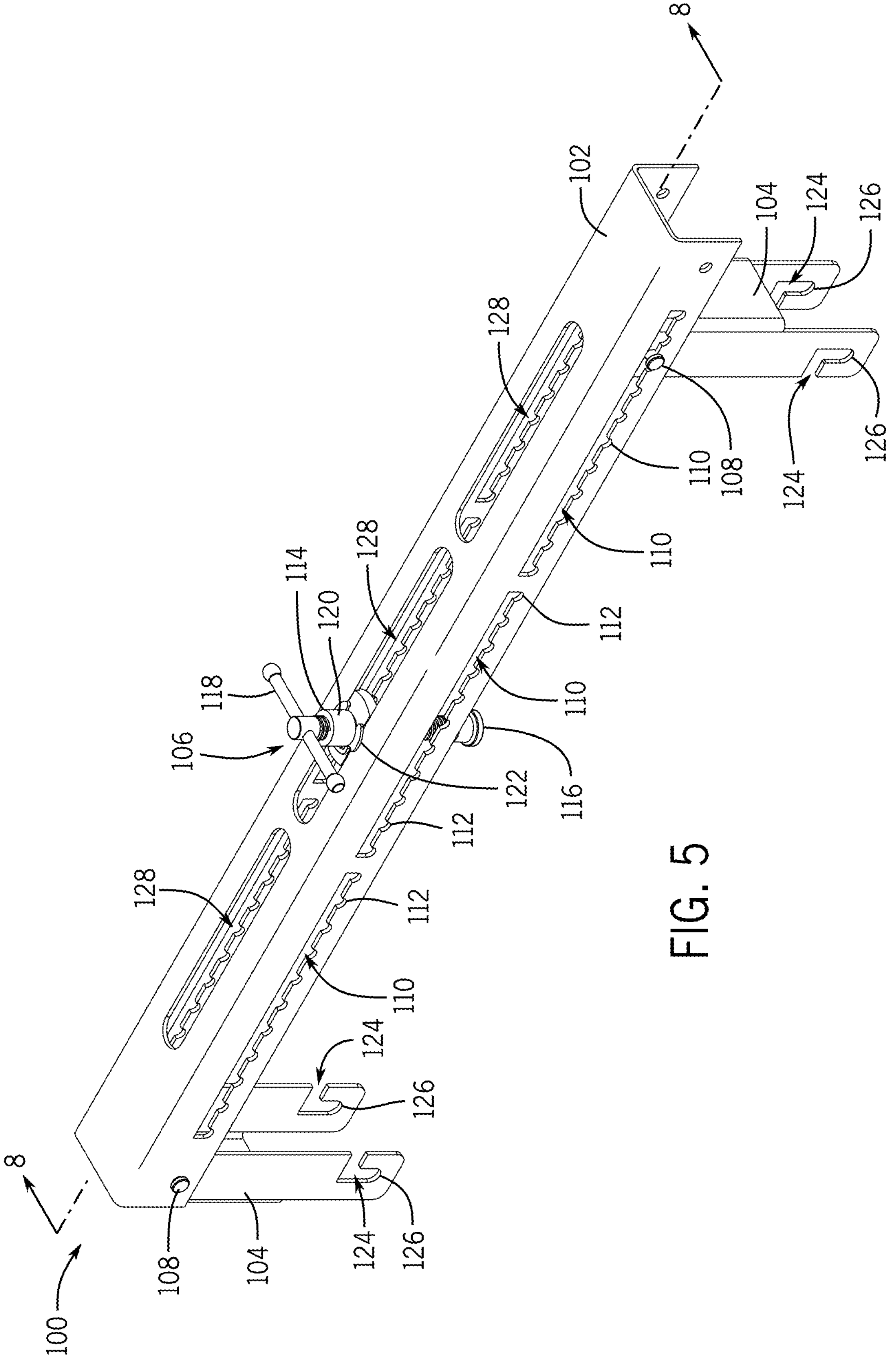
FIG. 5 is a perspective view of the clamping caul assembly of FIG. 4.
Figure 6:
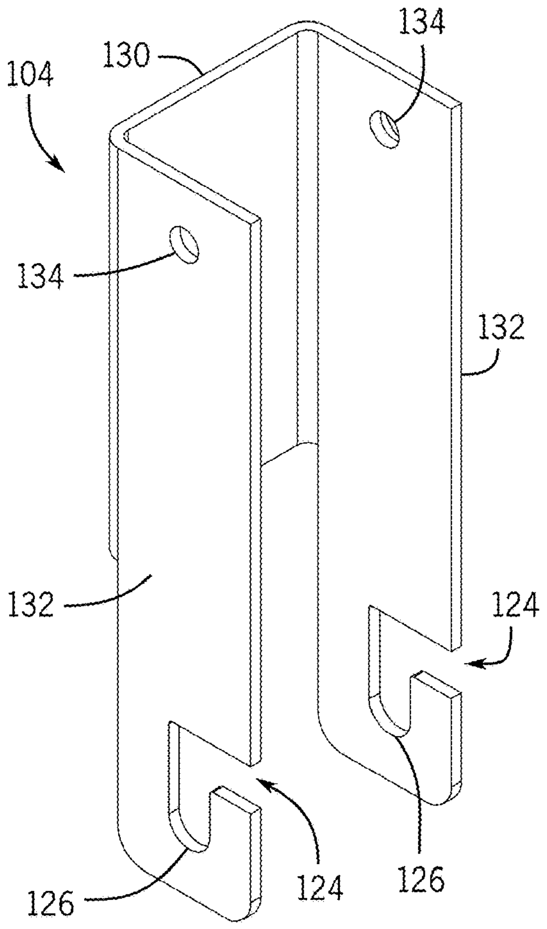
FIG. 6 is a perspective view of a side bracket used in the clamping caul assembly of FIG. 4.
Figure 7:
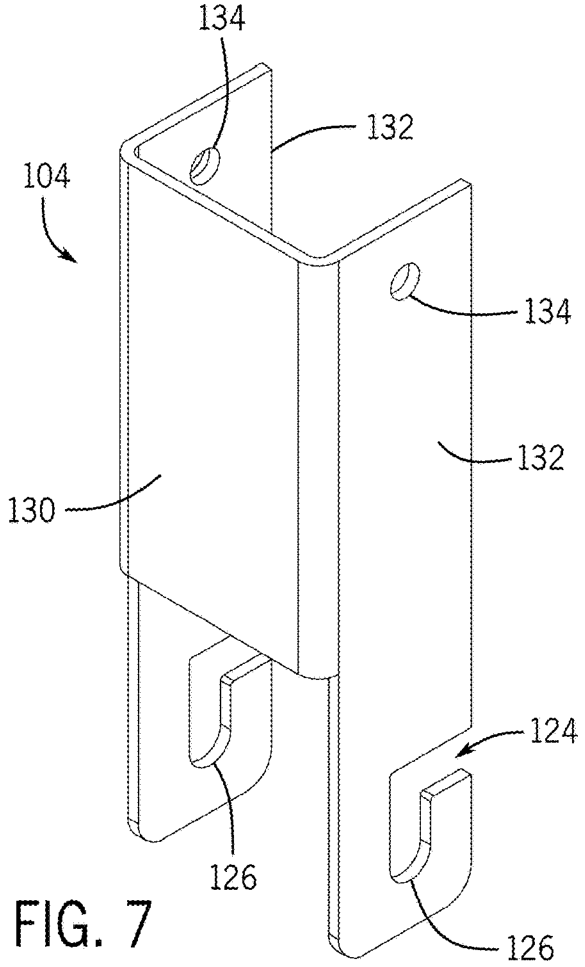
FIG. 7 is another perspective view of the side bracket of FIG. 6.

Turning specifically to FIGS. 6 and 7, perspective views of the side brackets 104 are shown. The side brackets 104 are shown to be generally U-shaped, with a main wall 130 and a pair of side walls 132 extending therefrom. Each of the side walls 132 is shown to include a caul pin receiving hole 134 formed therethrough. When the side brackets 104 are positioned within the top bracket 102 (see FIGS. 5 and 8), clevis pins 108 may extend through the caul pin receiving holes 134 to retain the side brackets 104 to the top bracket 102. Opposite the caul pin receiving holes 134, each of the side walls 132 is shown to include a locating pin receiving recess 124 and semi-circular shaped locating pin rest surface 126. When the side brackets are secured to the locating pins 212 (see FIGS. 1 and 2) and the threaded clamp assembly 106 is positioned to exert a force against the caul 306, the locating pins 212 may contact the locating pin rest surfaces 126. The materials used in fabricating the top bracket 102 and side brackets 104 are not particularly limited, and may be any metallic (e.g., 6061 aluminum) or plastic (e.g., ABS) material that is sufficiently rigid to support the threaded clamp assembly 106.

Figure 8:
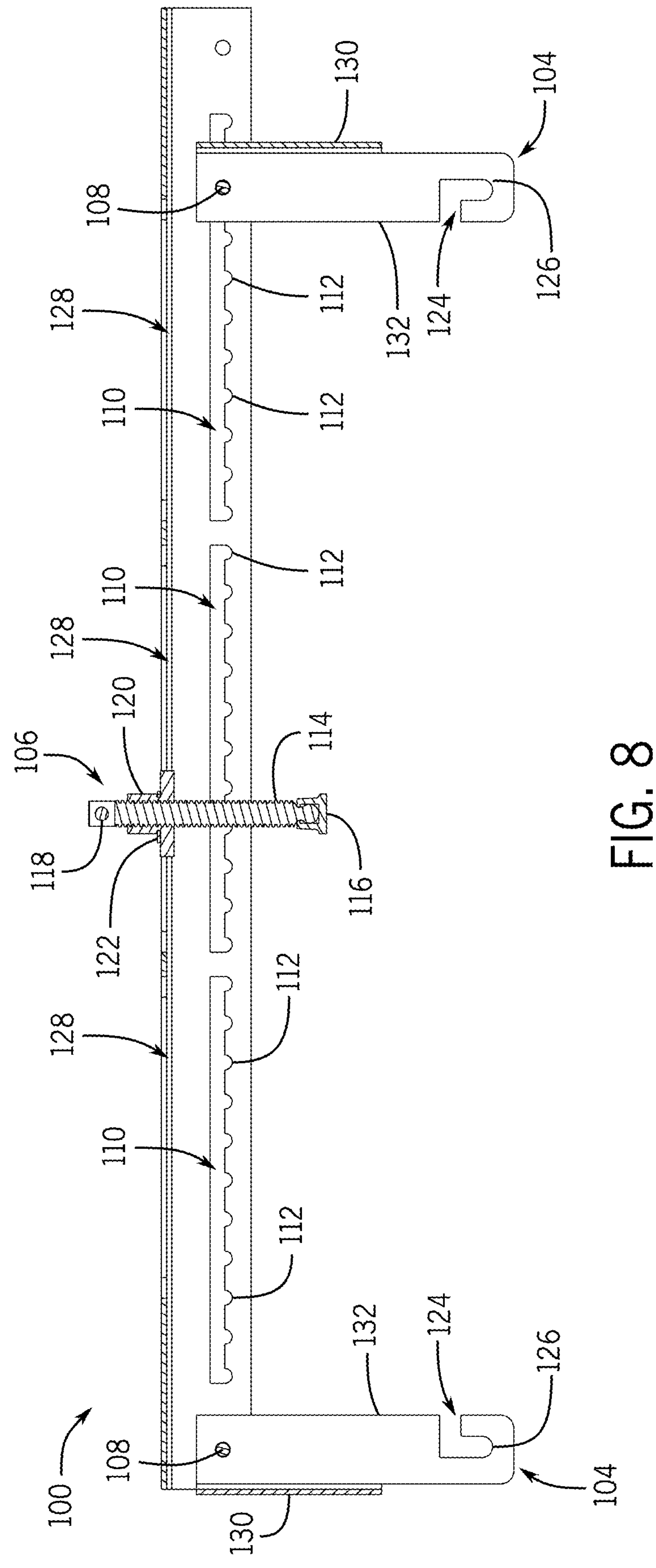
FIG. 8 is a side cross-sectional view of the clamping caul assembly taken along the line 8-8 of FIG. 5.

The threaded clamp assembly 106, as best shown in the perspective view of FIG. 5 and the sectional view of FIG. 8, is shown to include a threaded member 114 that terminates in a clamp end 116 and a handle portion 118 located opposite the clamp end 116. The threaded member 114 is retained relative to the top bracket 102 using a threaded collar component 120. In order to exert a force on the caul 306 and thereby apply pressure to the project portions 302, 304, a user can turn the handle portion 118 and move the threaded member 114 and the clamp end 116 downwardly towards the caul 306. The handle portion 118 is merely exemplary and in other implementations, a different adjustment mechanism (e.g., a knob) for the threaded member 114 could be utilized.

The threaded collar component 120 is configured to be retained within one of multiple threaded clamp assembly recesses 128 (see FIG. 5) using a retaining ring 122. Although the FIGURES depict the clamping caul assembly 100 as including only one threaded clamp assembly 106 positioned in recess 128 in the center of the top bracket 102, in other implementations, the clamping caul assembly 100 could include a different number of threaded clamp assemblies 102, positioned differently within recesses 128. For example, another implementation could include a pair of threaded clamp assemblies 106 positioned in the outermost recesses 128, rather than the center recess 128.

Figure 9:
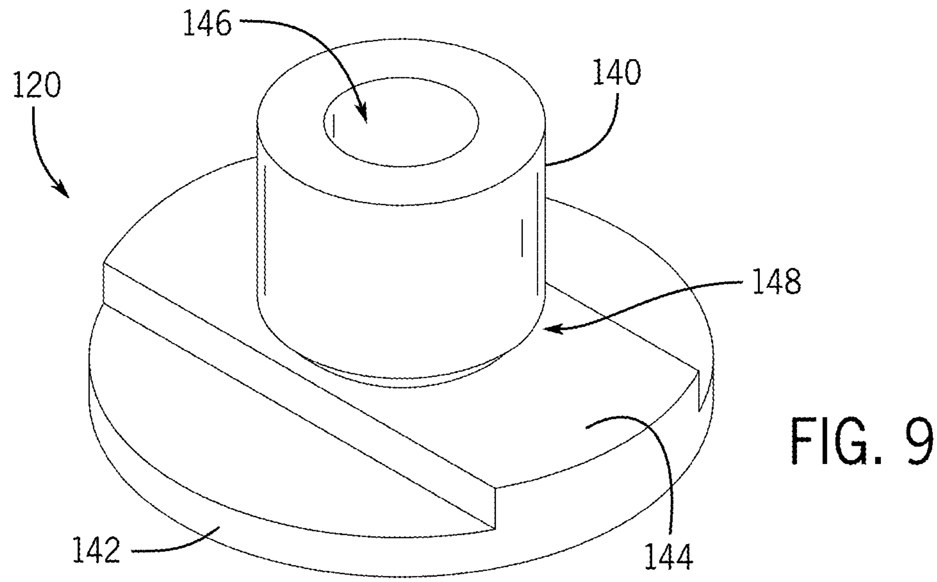
FIG. 9 is a perspective view of a collar component used in the clamping caul assembly of FIG. 4.
Figure 10:
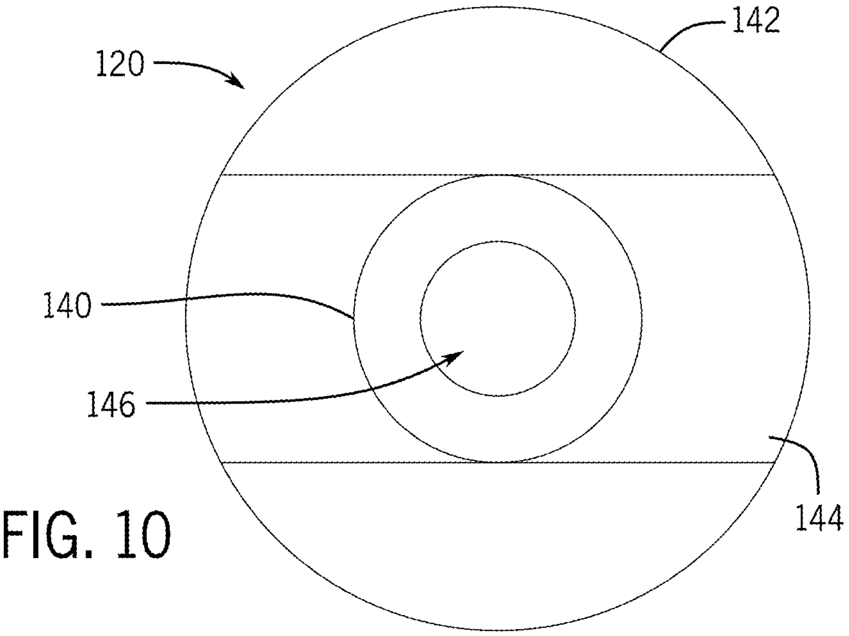
FIG. 10 is a top view of the collar component of FIG. 9.
Figure 11:
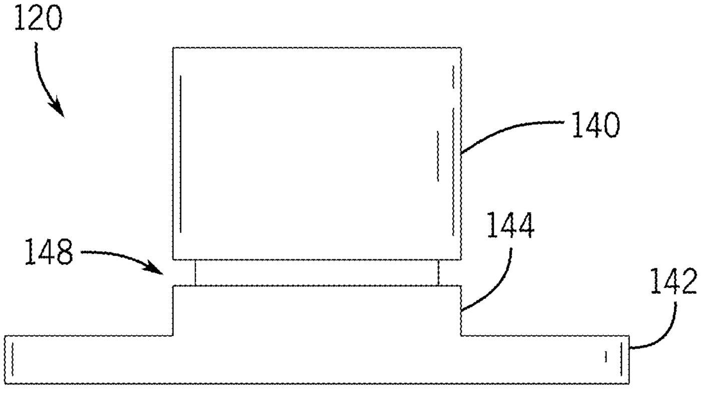
FIG. 11 is a side view of the collar component of FIG. 9.

FIGS. 9-11 respectively depict perspective, top, and front views of the threaded collar component 120. In an exemplary implementation, the threaded collar component 120 includes a main body portion 140 with a threaded hole 146 formed therethrough that is configured to engage with the threaded member 114. Opposite the main body portion 140 is a collar portion 142 with a central raised portion 144. The central raised portion 144 is configured to fit within the recess 128 and prevent rotation of the threaded collar component 120 during rotation of the handle portion 118 and the threaded member 114. An undercut region 148 is further shown to be located between the main body portion 140 and the central raised portion 144. The undercut region 148 is configured to receive the retaining ring 122 and thereby retain the threaded collar component 120 within the recess 128 of the top bracket 102. In an exemplary implementation, the retaining ring 122 does not fixedly couple the threaded collar component 120 to the top bracket 102, and the threaded collar component 120 is movable (i.e., slidable) within the recess 128.

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims. The methods herein are not limited to being performed in the order described, but could be performed in any logical order.

What is claimed is:

1. A clamped project bracket assembly configured to secure a clamped project, the clamped project bracket assembly comprising:

a clamp assembly comprising a structural member, a first clamp portion and a second clamp portion, wherein the first and second clamp portions are configured to apply a force along a first direction to the clamped project positioned between the first and second clamp portions; and a clamping caul assembly comprising:

a first side bracket and a second side bracket detachably coupled to the clamp assembly and configured to locate the clamped project therebetween;

a top bracket coupled to the first side bracket and the second side bracket and configured such that the clamped project is located between the top bracket and the structural member, wherein the top bracket comprises at least one recess formed therethrough and wherein the first side bracket and the second side bracket are coupled to the top bracket using a first pin and a second pin; and at least one threaded member terminating in a clamp end, wherein the at least one threaded member is configured to extend through the at least one recess and wherein the clamp end is configured to apply a force along a second direction to the clamped project that is perpendicular to the first direction.

2. The clamped project bracket assembly of claim 1, wherein the first side bracket is fixedly coupled to the top bracket using the first pin.

3. The clamped project bracket assembly of claim 1, wherein the second side bracket is detachably coupled to the top bracket using the second pin.

4. The clamped project bracket assembly of claim 3, wherein the top bracket further comprises a plurality of pin receiving portions formed therethrough, and wherein the second pin is configured to extend through one of the plurality of pin receiving portions such that a position of the second side bracket is adjustable relative to the top bracket.

5. The clamped project bracket assembly of claim 4, wherein the top bracket is generally U-shaped having a top wall and a pair of side walls extending generally perpendicularly therefrom.

6. The clamped project bracket assembly of claim 5, wherein the at least one recess is formed through the top wall, and wherein the plurality of pin receiving portions are formed through the pair of side walls.

7. The clamped project bracket assembly of claim 1, wherein the at least one threaded member further comprises a handle portion opposite the clamp end, and wherein rotation of the handle is configured to modify a position of the clamp end relative to the top bracket along the second direction.

8. The clamped project bracket assembly of claim 1, wherein the at least one threaded member is coupled to the top bracket using a threaded collar component comprising a main body portion with a threaded hole and a central raised portion extending from the main body portion, wherein the central raised portion is configured to fit through the at least one recess.

9. The clamped project bracket assembly of claim 8, wherein:

the clamping caul assembly further comprises a retaining ring;

the threaded collar component further comprises an undercut region located between the main body portion and the central raised portion; and the undercut region is configured to receive the retaining ring and thereby retain the threaded collar component within the at least one recess.

10. The clamped project bracket assembly of claim 1, further comprising a caul, wherein the caul is located between the clamped project and the clamp end of the at least one threaded member.

11. A method of securing a clamped project, the method comprising:

providing a clamp assembly comprising a structural member, a first clamp portion and a second clamp portion;

positioning the clamped project between the first clamp portion and the second clamp portion, wherein at least one of the first clamp portion and the second clamp portion are configured to be moved along a first direction relative to the structural member to apply a force along the first direction to the clamped project;

coupling a clamping caul assembly to the clamp assembly, wherein the clamping caul assembly comprises:

a first side bracket and a second side bracket;

a top bracket coupled to the first side bracket and the second side bracket and configured such that the clamped project is located between the top bracket and the structural member, wherein the top bracket comprises at least one recess formed therethrough and wherein the first side bracket and the second side bracket are coupled to the top bracket using a first pin and a second pin; and at least one threaded member terminating in a clamp end, wherein the at least one threaded member is configured to extend through the at least one recess; and moving the clamp end relative to the top bracket to apply a force along a second direction to the clamped project that is perpendicular to the first direction.

12. The method of claim 11, wherein the first side bracket is fixedly coupled to the top bracket using the first pin, and wherein the second side bracket is detachably coupled to the top bracket using the second pin.

13. The method of claim 12, wherein the top bracket further comprises a plurality of pin receiving portions formed therethrough, and wherein the second pin is configured to extend through one of the plurality of pin receiving portions such that a position of the second side bracket is adjustable relative to the top bracket.

14. The method of claim 13, wherein the top bracket is generally U-shaped having a top wall and a pair of side walls extending generally perpendicularly therefrom, wherein the at least one recess is formed through the top wall, and wherein the plurality of pin receiving portions are formed through the pair of side walls.

15. The method of claim 11, wherein the at least one threaded member further comprises a handle portion opposite the clamp end, and wherein moving the clamp end relative to the top bracket to apply a force along the second direction comprises rotating the handle portion.

16. The method of claim 11, wherein the at least one threaded member is coupled to the top bracket using a threaded collar component comprising a main body portion with a threaded hole and a central raised portion extending from the main body portion, wherein the central raised portion is configured to fit through the at least one recess.

17. The method of claim 16, wherein:

the clamping caul assembly further comprises a retaining ring;

the threaded collar component further comprises an undercut region located between the main body portion and the central raised portion; and the undercut region is configured to receive the retaining ring and thereby retain the threaded collar component within the at least one recess.

18. The method of claim 17, wherein the threaded collar component is movable within the at least one recess.

19. The method of claim 11, wherein the method further comprises placing a caul between the clamped project and the clamp end of the at least one threaded member prior to moving the clamp end relative to the top bracket to apply the force along the second direction.

* * * * *